United States Patent
Kenkel

(10) Patent No.: US 12,082,538 B2
(45) Date of Patent: Sep. 10, 2024

(54) SYSTEM AND METHOD TO IMPROVE PLANT GROWTH

(71) Applicant: Springworks Farm Maine Inc., Lisbon, ME (US)

(72) Inventor: Trevor Kenkel, Brunswick, ME (US)

(73) Assignee: Springworks Farm Maine Inc., Lisbon, ME (US)

(*) Notice: Subject to any disclaimer, the term of this patent is extended or adjusted under 35 U.S.C. 154(b) by 285 days.

(21) Appl. No.: 17/287,420

(22) PCT Filed: Oct. 25, 2019

(86) PCT No.: PCT/US2019/058222
§ 371 (c)(1),
(2) Date: Apr. 21, 2021

(87) PCT Pub. No.: WO2020/087045
PCT Pub. Date: Apr. 30, 2020

(65) Prior Publication Data
US 2021/0386027 A1    Dec. 16, 2021

Related U.S. Application Data

(60) Provisional application No. 62/750,767, filed on Oct. 25, 2018.

(51) Int. Cl.
*A01G 25/02* (2006.01)
*A01G 7/02* (2006.01)
*A01G 13/02* (2006.01)

(52) U.S. Cl.
CPC .............. *A01G 25/023* (2013.01); *A01G 7/02* (2013.01); *A01G 13/0268* (2013.01)

(58) Field of Classification Search
CPC ..... A01G 25/023; A01G 7/02; A01G 13/0268
See application file for complete search history.

(56) References Cited

U.S. PATENT DOCUMENTS

| 3,274,730 A | 9/1966 | Bose |
| 4,324,069 A | 4/1982 | Flagg |

(Continued)

FOREIGN PATENT DOCUMENTS

| CA | 1250144 | 10/1993 |
| CA | 2729273 | 1/2010 |

(Continued)

OTHER PUBLICATIONS

European Extended Search Report in corresponding European application 19877279.0, Jul. 15, 2022, 9 pp.

(Continued)

*Primary Examiner* — Monica L Perry
*Assistant Examiner* — Aaron M Rodziwicz
(74) *Attorney, Agent, or Firm* — Caseiro Burke LLC; Chris A. Caseiro; Nicholas A. McCrillis

(57) ABSTRACT

A system and method to facilitate the growth of a plant in a building. The system includes a substrate that is substantially solid, an inflatable raft, or that has an upper member and a lower member with a space therebetween to establish an interior of the substrate. Either form of substrate includes one or more plant retainers and a set of one or more gaseous fluid delivery ports located regularly or irregularly throughout the substrate, including localized in a vicinity of each of the one or more plant retainers. The system further includes a climate delivery subsystem including a gaseous fluid source, a gaseous fluid delivery apparatus, such as a pump and one or more conduits in the substrate, wherein each of the one or more conduits is in communication with each set of the one or more gaseous fluid delivery ports for delivery of the gaseous fluid to an underside of the plant, wherein the one or more conduits are coupled to the gaseous fluid delivery apparatus.

9 Claims, 9 Drawing Sheets

(56) References Cited

U.S. PATENT DOCUMENTS

| | | | |
|---|---|---|---|
| 4,884,366 A | 12/1989 | Morton | |
| 5,136,804 A * | 8/1992 | Rothem | B05B 17/0615 |
| | | | 47/60 |
| 5,315,834 A | 5/1994 | Garunts et al. | |
| 5,956,897 A * | 9/1999 | Takashima | A01G 31/00 |
| | | | 47/60 |
| 6,006,471 A * | 12/1999 | Sun | B01D 53/85 |
| | | | 47/62 A |
| 6,727,091 B2 * | 4/2004 | Darlington | A01G 31/02 |
| | | | 47/64 |
| 8,443,546 B1 * | 5/2013 | Darin | A01G 31/02 |
| | | | 47/60 |
| 8,707,619 B2 * | 4/2014 | Edwards | A01G 27/04 |
| | | | 96/135 |
| 9,010,019 B2 * | 4/2015 | Mittelmark | F24F 8/22 |
| | | | 47/17 |
| 9,032,665 B2 * | 5/2015 | Whitney | A01G 31/02 |
| | | | 47/62 A |
| 9,480,207 B2 | 11/2016 | Tanase et al. | |
| 9,775,302 B2 | 10/2017 | Motoyama et al. | |
| 10,477,779 B2 * | 11/2019 | Hutzel | A01G 9/025 |
| 10,499,574 B2 * | 12/2019 | Lu | G08B 21/18 |
| 10,667,472 B2 * | 6/2020 | Muanchart | A01G 7/02 |
| 11,412,668 B2 * | 8/2022 | Houweling | A01G 9/14 |
| 11,540,452 B2 * | 1/2023 | Muanchart | A01G 9/18 |
| 2004/0194371 A1 | 10/2004 | Kinnis | |
| 2004/0255513 A1 * | 12/2004 | Becker | A01G 31/00 |
| | | | 47/65.9 |
| 2013/0111811 A1 | 5/2013 | Miyauchi et al. | |
| 2016/0135396 A1 | 5/2016 | Day | |
| 2016/0242372 A1 | 8/2016 | Wong et al. | |
| 2016/0270310 A1 * | 9/2016 | Botman | A01G 24/44 |
| 2016/0295820 A1 | 10/2016 | Akyroyd et al. | |
| 2017/0156275 A1 | 6/2017 | Yano et al. | |
| 2017/0339853 A1 * | 11/2017 | Sun | A01G 7/00 |
| 2018/0037482 A1 * | 2/2018 | Y Hu | A01K 63/045 |
| 2018/0049374 A1 | 2/2018 | Gasmer et al. | |
| 2018/0359946 A1 * | 12/2018 | Rossi | A01G 9/20 |
| 2019/0045731 A1 * | 2/2019 | Dixon | A01G 31/02 |
| 2019/0090434 A1 * | 3/2019 | Bailey, Jr. | A01G 9/24 |

FOREIGN PATENT DOCUMENTS

| | | |
|---|---|---|
| DE | 0398868 | 5/1990 |
| EP | 0052264 | 5/1982 |
| EP | 0398868 | 11/1990 |
| EP | 1464218 | 1/2006 |
| GB | 1349001 | 3/1974 |
| WO | WO92/06585 | 4/1992 |
| WO | 2008/042919 | 4/2008 |
| WO | 2008/153384 | 12/2008 |
| WO | 2009/125023 | 10/2009 |
| WO | 2015/190214 | 12/2015 |
| WO | 2017/199621 | 11/2017 |

OTHER PUBLICATIONS

International Search Report and Written Opinion in corresponding PCT application No. PCT/US2019/058222, dated May 28, 2020, 12 pp.

Intellectual Property India, First Examination Report for Application No. 202127022727, Jan. 6, 2023, 6 pp.

* cited by examiner

SYSTEM AND METHOD TO IMPROVE PLANT GROWTH

FIELD OF THE INVENTION

The present invention relates to utilizing modified growing infrastructure to economically regulate a plant's microclimate in controlled environment agriculture (CEA).

BACKGROUND OF THE INVENTION

CEA is defined by its pursuit of growth optimization through the use of equipment to separate plants from volatile outdoor conditions. Generally, the result has been some form of control system actuating equipment, in a greenhouse or other building, to control the general environmental conditions of the space. Despite the considerable gain in efficiency over conventional field production, this too can be rife with inefficiency. Plants often take up a small percentage of overall volume, but the entire environment is typically conditioned for plant growth. Resources are expended on controlling the humidity, temperature, and carbon dioxide concentration (among other things) of the space as a whole rather than focusing on the microclimate of the plant. This microclimate is an area proximal to the plant that can often differ substantially from the overall climate due to plant gas exchange and boundary layer effects. CEA operators often deal with this microclimate by working to dissipate it using horizontal or vertical air circulation to disturb the space. This mixes the air of the general environment with the microclimate to remove boundary layers of environmental variables that may build. The present innovation seeks to give CEA operators a different way of handling the plant's microclimate. Instead of simply mixing in air from the general environment, our innovation seeks to add another layer of control for a CEA operator. The precision added by microclimate control could significantly reduce resources dedicated to carbon dioxide enrichment, humidity, temperature control (among other things). This may improve plant growth and reduce the cost associated with growing each plant.

SUMMARY OF THE INVENTION

The goal of the present invention is to substantially improve the economic and resource efficiency of CEA operations using the microclimate control system and method of the present invention. This is done by redesigning the growing infrastructure to accommodate microclimate monitoring and implementation. The system and method establish, maintain and modify as needed the microclimate adjacent to each plant within a building. The system is an apparatus and associated control functions to create and regulate the climate in the vicinity of each plant. The apparatus includes a substrate for removably retaining plants thereto and one or more components for transferring desired climate elements to each plant retained by the substrate.

The invention enables the mass modification of a plurality of microclimates in that the system can be employed to adjust gaseous fluid delivery on a relatively large scale to adjust the microclimates around a plurality of plants, rather than making such adjustments individually and rather than adjusting the macro climate. For purposes of describing the present invention, a microclimate is not of any specific dimensions but is instead defined as a zone or volume that experiences a measurable modification resulting from the output of an individual plant. It is that zone or volume that the present invention impacts through local gas exchange with the plant. That exchange may occur at the underside of the plant. On the other hand, a macro climate is the broader environment within a structure that contains growing plants that essentially treats plants from the top down. To the extent any underside treatment occurs, it is incidental or not targeted with adequate accuracy or resolution.

The transfer components include a climate delivery subsystem and a microclimate control subsystem. The climate delivery subsystem provides a pressurized gaseous fluid, such as air but not limited thereto, through one or more conduits that are part of the growing infrastructure. The gaseous fluid transfer to the plant is regulated by the microclimate control subsystem to establish microclimate conditions at each of a plurality of plants deemed proper for each plant's growth. The pressurized gaseous fluid flows through the one or more conduits of the connected growing infrastructure to the growing area and contacts the plants from underneath. More generally, the microclimate control subsystem may form part of a larger climate control system that can be used to regulate conditions throughout the environment within which a plant is located. That is, the climate control system may be used to adjust conditions within a structure, such as a greenhouse, including, but not limited to, heating, ventilation and air conditioning, as well as humidity control, and water delivery.

This allows us to shrink the area that needs to be tightly regulated for plant growth proximal to the plants and results in the modified environment contacting the underside of plant leaves. Given that the underside of the plant leaves is where the bulk of gas exchange occurs, this provides an advantage for carbon dioxide enrichment and dehumidification (among other things). The leaves also help provide a boundary layer to trap this modified atmosphere near the stomata of the plant. Ultimately, this should reduce considerably the magnitude of resources spent on atmospheric control for the plants in the building. These advantages can be seen from the following detailed description and the accompanying drawings.

The invention includes a system to facilitate the growth of a plant in a building. The system includes a substrate with one or more plant retainers of the upper member and a set of one or more gaseous fluid delivery ports located in a vicinity of each of the one or more plant retainers or positioned throughout the substrate and not limited to being solely adjacent to the plants, and a climate delivery subsystem including a gaseous fluid source, a gaseous fluid delivery apparatus, such as a pump or a combination of components suitable to controlling gaseous fluid condition and delivery, and one or more conduits in the space between the upper member and the lower member of the substrate, wherein each of the one or more conduits is in communication with each set of the one or more gaseous fluid delivery ports for delivery of the gaseous fluid to an underside of the plant, wherein the one or more conduits are coupled to the gaseous fluid delivery apparatus. The system optionally also includes a microclimate control subsystem, wherein the microclimate control subsystem includes a processor programmed to regulate operation of the gaseous fluid delivery apparatus and one or more atmosphere sensors arranged to gather information about a microclimate in the vicinity of the plant to aid in regulation of operation of the gaseous fluid delivery apparatus. The microclimate control subsystem may form part of a larger climate control system. The substrate may be a unitary structure and may include an inflatable raft-like structure, or it may be formed of a top piece that is the upper member connected to a bottom piece that is the lower member. In the non-unitary form, the bottom piece may be a pitched trough. In a form of the substrate, it may have an upper member and a lower with a space between them. The space is open and the one or more conduits is a single conduit that is the open space. In another form, the substrate includes one or more dividers in the space between the upper member and the lower member, wherein the one or more dividers establish two or more channels in the space and wherein the two or more channels are the one or more conduits. The delivery subsystem may include a plurality of tubes coupled to the gaseous fluid delivery ports, wherein the plurality of tubes are the one or more conduits. At least one of the gaseous fluid delivery ports may include a nozzle. The nozzle may be configured to form a selectable spray pattern of the gaseous fluid about the plant retainer.

The invention also includes a method for establishing a microclimate in the vicinity of a plant. The method includes the steps of inserting one or more plant seedlings or root elements into one or more plant retainers of a substrate, delivering with a climate delivery subsystem a gaseous fluid to one or more of the ports adjacent to the one or more plant retainers, sensing environmental conditions in the microclimate associated with each of the one or more retainers and adjusting delivery of the gaseous fluid as a function of the sensed environmental conditions. The substrate and the delivery subsystem may be of the form described herein. The gaseous fluid includes carbon dioxide content. Delivery of the gaseous fluid includes delivering the gaseous fluid directly throughout the interior of the substrate, through one or more channels and/or through one or more conduits.

A version of the system contemplates a substantially solid substrate that includes one or more plant retainers and a set of one or more gaseous fluid delivery ports located in a vicinity of each of the one or more plant retainers. It also includes a climate delivery subsystem including a gaseous fluid source, a gaseous fluid delivery component and one or more conduits in communication with each set of the one or more gaseous fluid delivery ports for delivery of the gaseous fluid to an underside of the plant, wherein the one or more conduits are coupled to the gaseous fluid delivery component. For example, in an embodiment of the invention, the substrate may be an inflatable buoyant material that is similar to a raft made of a nonmetallic material such as a plastic. This form of substrate may include one or more ports for retaining one or more plants therein.

DETAILED DESCRIPTION OF THE INVENTION

Figure 1:
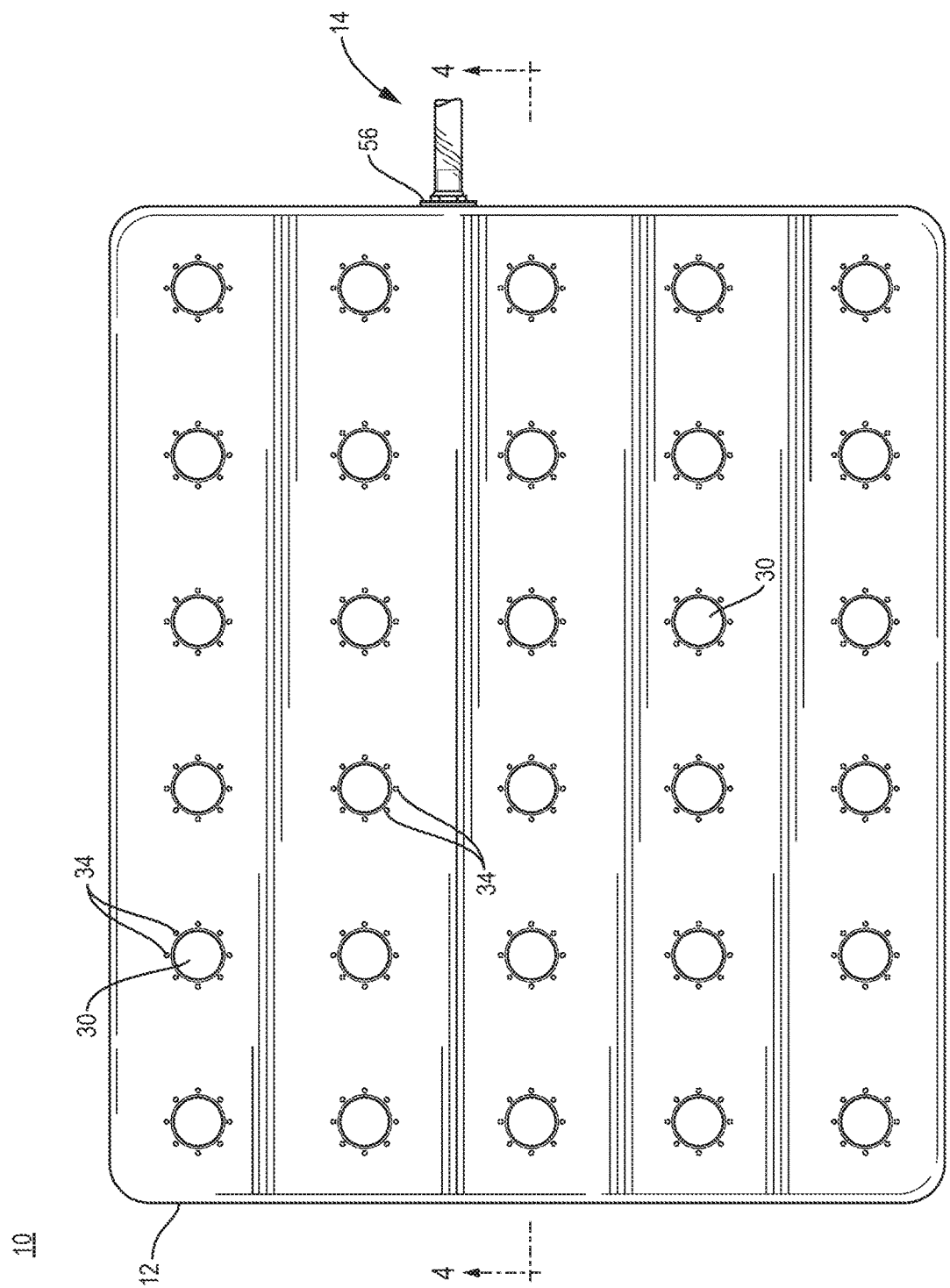
FIG. 1 is a top view of a first embodiment of a system of the present invention for establishing a microclimate about a plant, the system having a common interior and a single gaseous fluid inlet.
Figure 2:
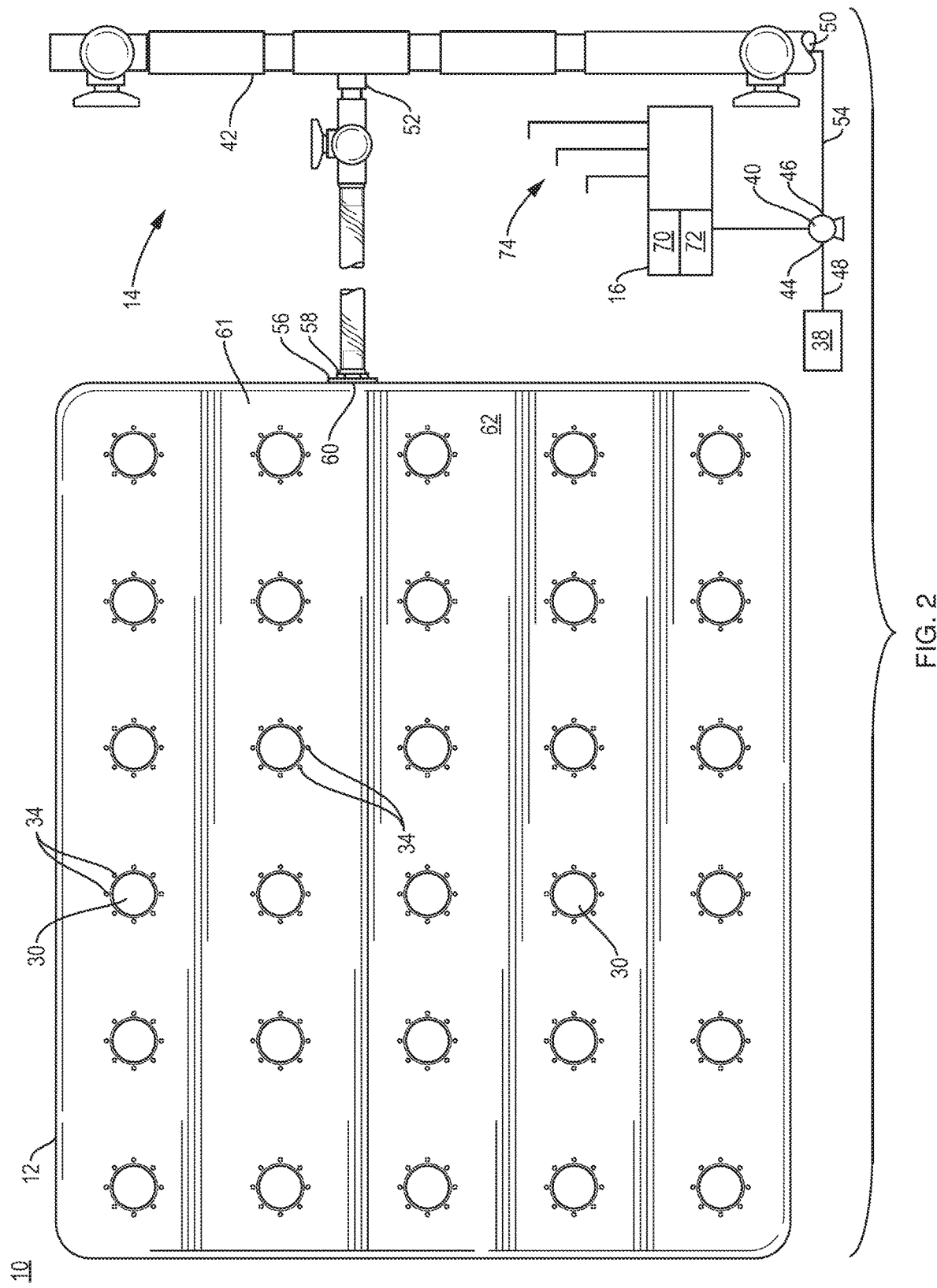
FIG. 2 is a top view of the system of FIG. 1 showing the single inlet coupled to a gaseous fluid source.
Figure 4:
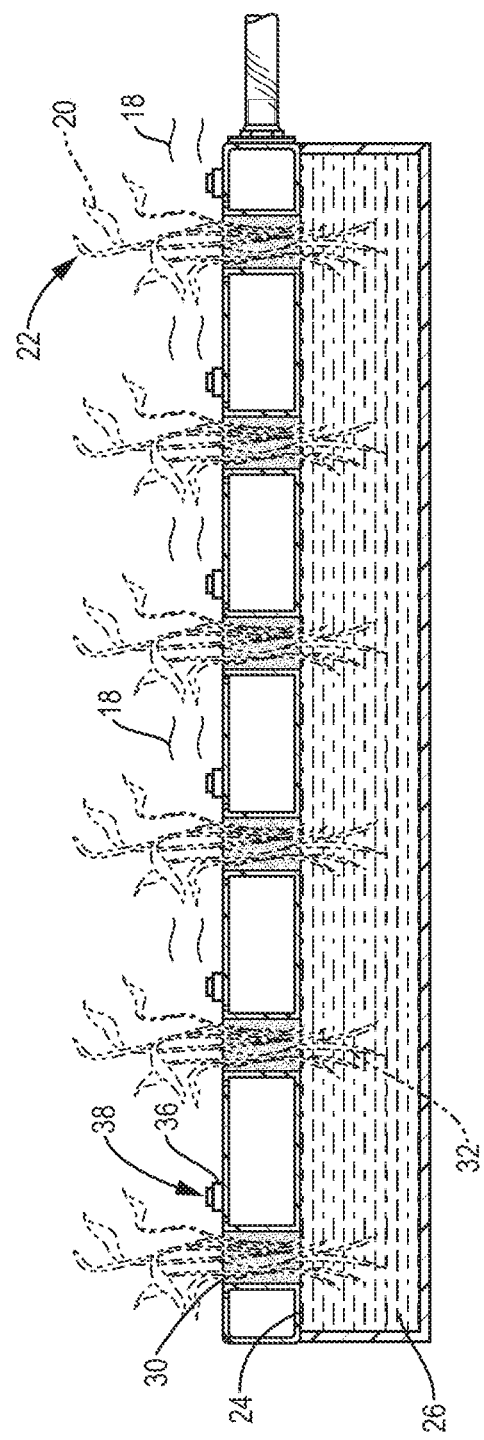
FIG. 4 is a cross sectional side view of a portion of the system of FIG. 1.

A first embodiment of an efficient plant growth system 10 of the present invention is shown in FIGS. 1, 2 and 4. The system includes a plant retaining substrate 12, a climate delivery subsystem 14 and a microclimate control subsystem 16. The substrate 12, climate delivery subsystem 14 and the microclimate control subsystem 16 are used in combination to deliver a desired atmosphere 18 to underside 20 of a plant 22 that is growing in a building.

The substrate 12 is fabricated of a material that either floats on or that is retained in position on a surface 24. The surface may be solid or it may be a fluid 26 such as water, for example. The substrate 12 is made of a nonmetallic material such as polyethylene or polypropylene plastic but not limited thereto. The substrate 12 is made with sufficient structural integrity to minimize flexing or other undesirable distortion and to support a plurality if plants retained thereto. The substrate 12 will also maintain a positive buoyancy while on the fluid 26 and while containing contents of interest, such as a plurality of the plants 22 as well as components of the climate delivery subsystem 14 and the microclimate control subsystem 16. However, such positive buoyancy is not required if the surface 24 is solid rather than the fluid 26.

Figure 5:
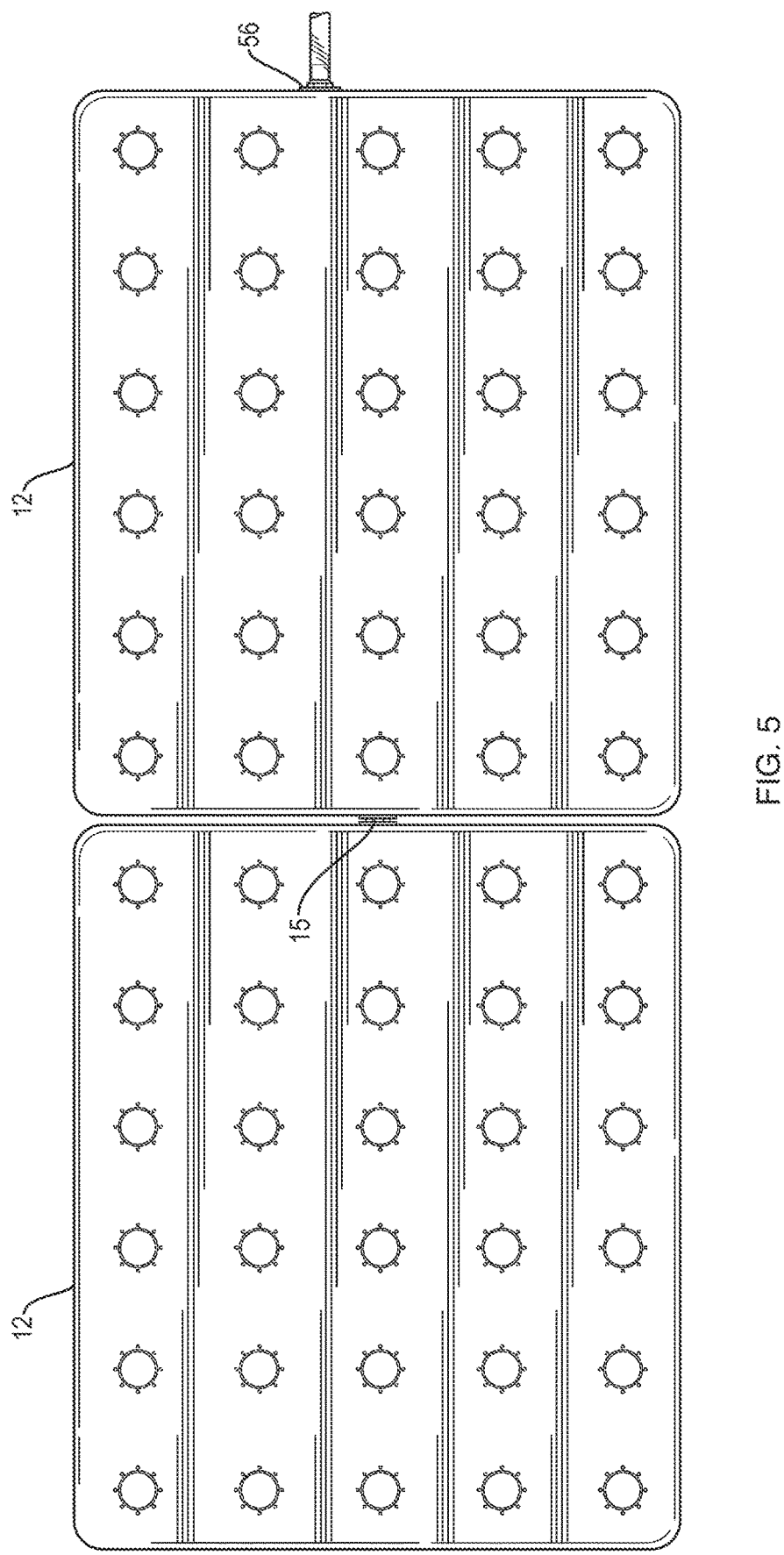
FIG. 5 is a top view of a version of a system of the present invention for establishing a microclimate about a plant, the system including a pair of retaining substrates coupled together and linked to a common gaseous fluid inlet.

The substrate 12 may be in a rectangular form but other configurations are possible. A plurality of such substrates 12 may be positioned adjacent to one another, such as in a trough, for example. The trough may contain the fluid 26, which may be used as a mechanism for easily moving each substrate 12 from one location to another, or the trough may contain no fluid. A plurality of substrates 12 may be joined together or they may be independent from one another. In an example shown in FIG. 5, the substrates 12 are joined together in series with a common coupling 15 used to complete the transfer of gaseous fluid from the inlet 56. All can be moved in the trough including when on the fluid 26.

The substrate 12 includes a plurality of plant retainers 30, each of which is sized and shaped to retain growth matter, such as liquid, soil or a combination of the two, as well as seedlings or a preliminary root system. The retainers 30 may be porous with pores 32 sufficiently large to allow the fluid 26 to pass therethrough. Alternatively, the pores 32 may be relatively smaller so that the retainer 30 may retain soil therein while also allowing some of the fluid 26 to seep in and maintain soil moistness suitable for plant growth. The retainers 30 may simply be cutouts of the substrate 12 at selectable locations or they may be removable containers positioned at selectable locations of the substrate 12.

The substrate 12 also includes one or more gaseous fluid delivery ports 34. The ports 34 are located near the retainers 30 at a selectable distance so that a microclimate of interest is established in the vicinity of the plant 22. The number of ports 34 and their positioning about the retainer 30 is selectable. The ports 34 are sized and configured to allow gaseous fluid to pass therethrough and form a pattern of the gaseous fluid that contacts the underside of the plant 22. Alternatively, the ports 34 are sized and configured to removably retain therein a gas delivery nozzle 36. Each such optional nozzle 36 forms part of the climate delivery subsystem 14. The nozzles 36 are configured with fluid flow ports 38 that are sized, spaced and shaped to deliver a selectable pattern of flow of gaseous fluid of a desired makeup to the space in the vicinity of the plant 22 in the area of the underside 20 of the plant 22 but not limited thereto. That is, the optional nozzles 36 are positioned to deliver desirable gaseous matter in the location of the plant 22 rather than in the general atmosphere in the building above the plant 22. Whether using the ports 34 directly or the nozzles 36 to deliver the gaseous fluid to the undersides of the plants, the ports or nozzle outlets are relatively small to deliver a fine spray of gaseous fluid that enables fine resolution of the microclimate about the plants, rather than a larger delivery port that may blast large volumes about the plants in a way that does not establish a microclimate that remains in effect. For example, a delivery port that is measured in inches rather than fractions of an inch are much less suitable as a feature of the present invention.

The climate delivery subsystem 14 includes a gaseous fluid source 38, one or more gaseous fluid delivery apparatuses 40, one or more manifolds 42 and one or more conduits for delivery of the gaseous fluid from the source 38 to the interior of the substrate 12. The source 38 may be a single tank of a gaseous fluid such as air, nitrogen, carbon dioxide or combinations of those and/or other gases that may be of interest for delivery to the plant 22. The source 38 may also be a condenser of some form that captures and concentrates gases of interest from the atmosphere. The source 38 is shown as a single element but that is simply a representation of what may be one or a plurality of gaseous fluid sources.

The source 38 is coupled to the one or more gaseous fluid delivery apparatuses 40, which are represented in the drawings as a single pump 40. The gaseous fluid delivery apparatus 40 is selected and configured to deliver a regulated volume of gaseous fluid from the source 38 to the one or more manifolds 42, which is represented as a single manifold 42. The gaseous fluid delivery apparatus 40 is also coupled to the microclimate control subsystem 16 arranged to control operation of the gaseous fluid delivery apparatus 40 for regulation of gaseous fluid flow to the manifold 42. The gaseous fluid delivery apparatus includes an input 44 and an output 46. The input 44 is coupled by source conduit 48 to an output of the source 38. The source conduit 48 may be tubing, such as metallic or nonmetallic tubing, including plastic tubing, suitable to transport gaseous fluid. The gaseous fluid delivery apparatus 40 may comprise one or more of a heater and/or chiller to heat or cool the gaseous fluid, a gas blending valve for CO2 mixing with air or another fluid, and a humidification/dehumidification mechanism to adjust the humidity of the gaseous fluid prior to delivery to the substrate 12, as well as a mechanism for gaseous fluid delivery, such as one or more pumps, blowers or fans. The components of the gaseous fluid delivery apparatus 40 may be standalone or integrated into a control system that is also linked to one or more environmental sensors so that they may be actuated and adjusted as desired based on sensed conditions below and above the plant 22. The control mechanism may be configured to regulate the rate of delivery of the gaseous fluid.

The manifold 42 includes one or more inputs 50 and one or more outputs 52. A single input 50 may be used to receive gaseous fluid from a single source, while a plurality of manifold inputs 50 may be used to receive a plurality of gaseous fluids from a plurality of sources, wherein mixing of the plurality of gaseous fluids occurs in a mixing cavity of the manifold 42. The number of outputs 52 is selectable and is dependent on the number of substrates 12 to be supplied with gaseous fluid from that manifold 42. The manifold input 50 is coupled to the output 46 by output conduit 54.

The climate delivery subsystem 14 further includes one or more gaseous fluid delivery portals 56 of each substrate 12. Each portal 56 includes an input 58 and an output 60. Each input 58 is coupled to one of the plurality of manifold outlets 52, and each output 60 terminates at, within or beyond an interior wall 61 of the substrate 12. Interior 62 of the substrate 12 may be substantially hollow or it may contain a plurality of channels 64 that run at least a portion of a length or width dimension of the substrate 12. When the interior 62 is substantially hollow, represented in FIGS. 1 and 2, only one gaseous fluid delivery portal 56 may be established in the substrate 12 for delivery of the gaseous fluid into the interior 62, although more than one portal 56 may be employed for that delivery. When the interior 62 includes a plurality of channels 64, represented by a second embodiment of the invention in FIG. 3, there may be at least one portal 56 for each channel 64, although each channel 64 may have more than one corresponding portal 56. The channels 64 function as conduits for gaseous fluid flow regulation. The gaseous fluid delivery apparatus 40 delivers the gaseous fluid to the portals 56 at sufficient pressure to ensure that the gaseous fluid enters the hollow interior or the channeled interior and vents through the ports 34 with or without nozzles 36 at sufficient rate to establish the microclimate at least at the underside of the plant 22.

Figure 3:
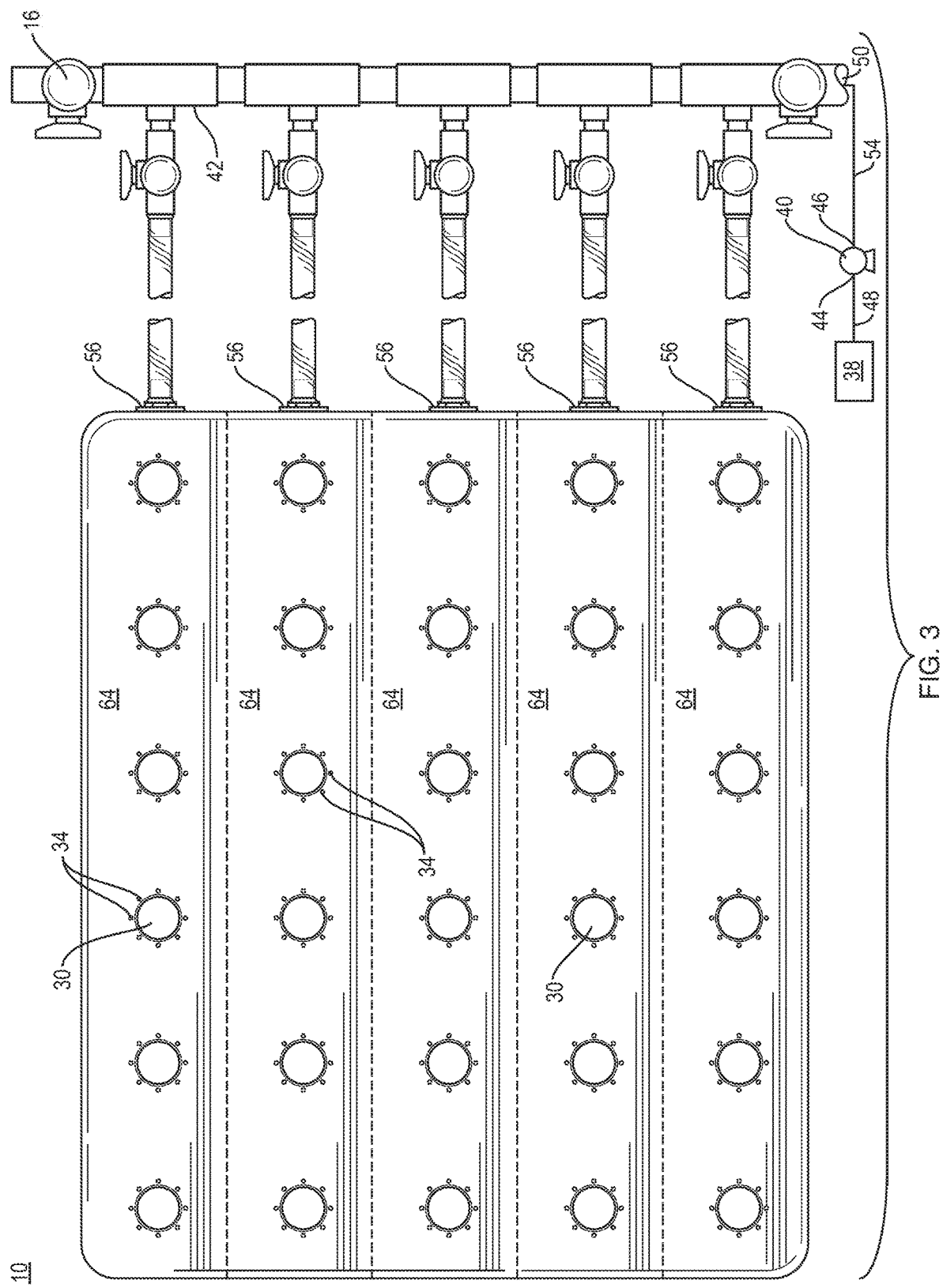
FIG. 3 is a top view of a second embodiment of a system of the present invention for establishing a microclimate about a plant, the system having a compartmentalized interior and multiple gaseous fluid inlets.

In the second embodiment of the invention shown in FIG. 3, the climate delivery subsystem 14 may include a series of conduits, which may be tubes, that are coupled between the gaseous fluid delivery portals 56 and the ports 34 or nozzles 36. That configuration may result in the use of less gaseous fluid for direct delivery to the plants 22; however, they represent more infrastructure to be purchased and maintained and so may be less convenient and more costly overall. It is to be understood that one or more valves may be employed at one or more locations between the gaseous fluid delivery apparatus 40 and the portals 56 to enable localized manual control of fluid movement to the plant 22. The conduits in the second embodiment described herein may pass over, under or through the substrate 12 in any combination.

Figure 6:
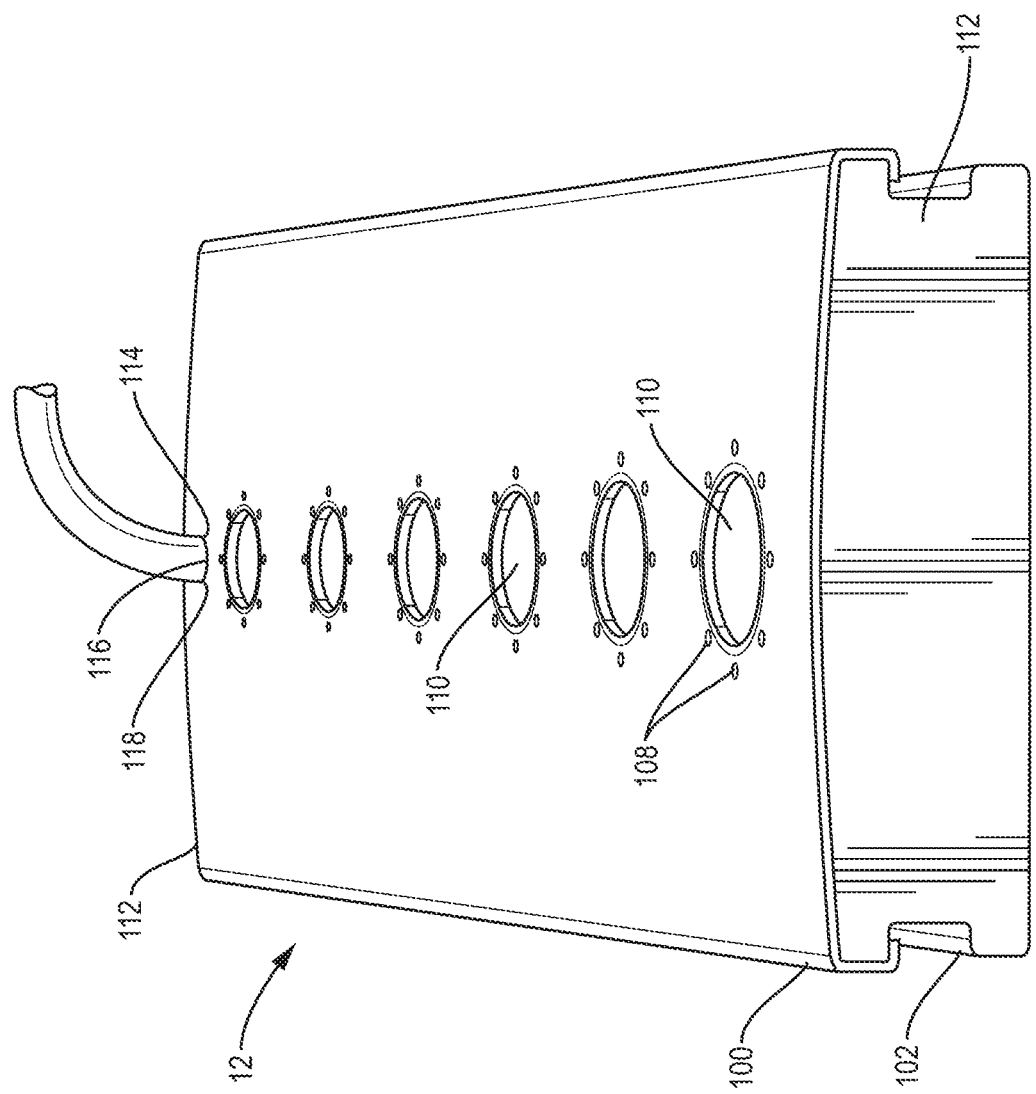
FIG. 6 is a top perspective view of a third embodiment of a system of the present invention for establishing a microclimate about a plant, the system including a double wall configuration of a top piece and a bottom piece.
Figure 7:
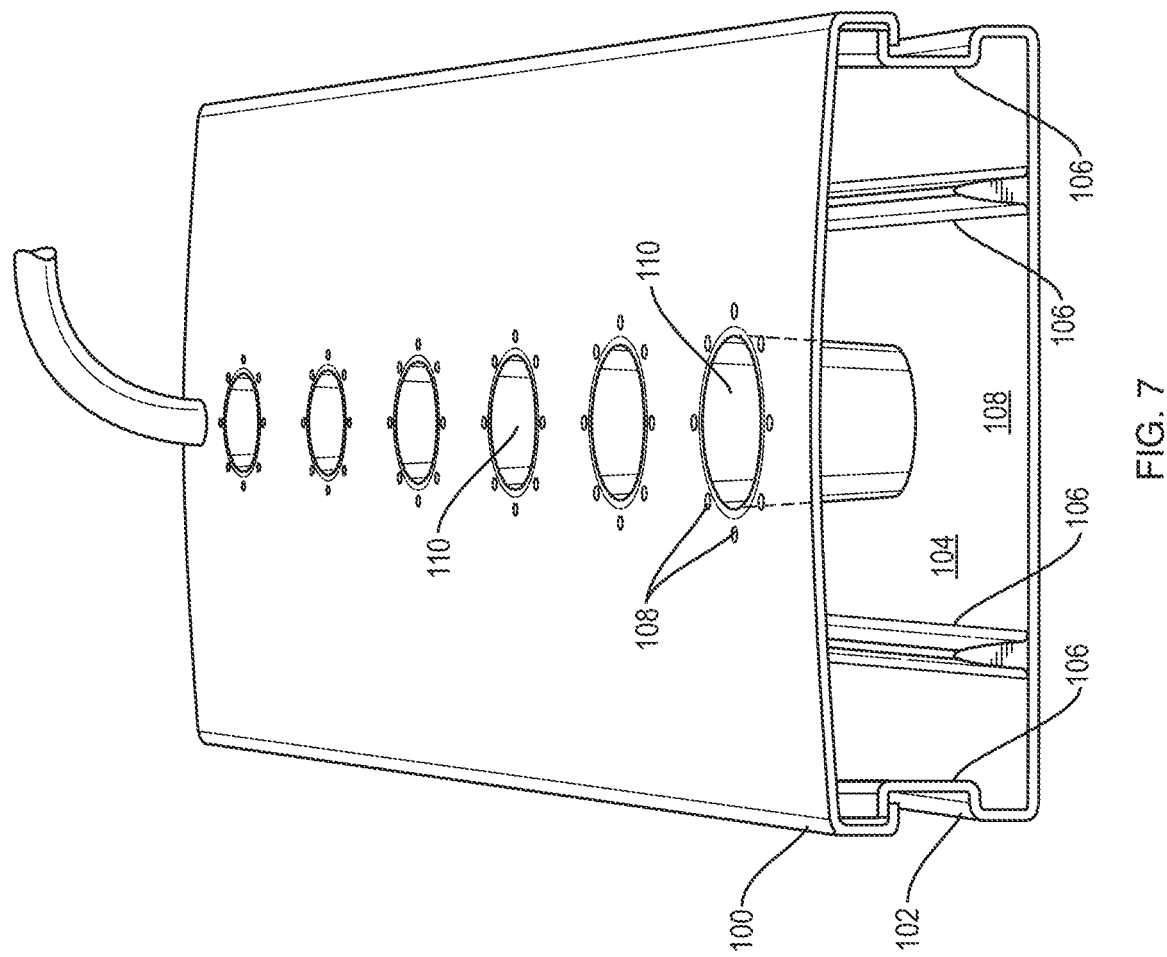
FIG. 7 is a top perspective view of the system of FIG. 6 with the end cap removed.

In a third embodiment of the invention shown in FIGS. 6 and 7, the substrate 12 is formed of two separate pieces, a top piece 100 and a bottom piece 102. The top piece 100 and the bottom piece 102 may be permanently or removably joined together. They may also be formed integrally with one another. This form of the substrate 12 may be referred to as a double-walled construction. Space 104 between the top piece 100 and the bottom piece 102 may be completely or substantially hollow, it may contain elements to maintain structural integrity, such as ribs, or it may be formed with a plurality of interior channels that are similar to the channels 64 of the first embodiment of the invention. The bottom piece 102 may be U-shaped or V-shaped. When V-shaped, there is a pitch to sidewalls 106 that can concentrate water and other items in bottom piece 102. The interior of either or both of the top piece 100 and the bottom piece 102 may be modified to include attached or integrated conduits used to transport gaseous fluid to gaseous fluid delivery ports 108 that extend at least partially around plant retainers 110 of the top piece 100. It is noted that the plant retainers 110 may be optional, with plants supported in a different manner at the top piece 100. Either or both of the top piece 100 and the bottom piece 102 include one or more portals 114, each having an input 116 and an output 118. Each input 116 is coupled to one of the plurality of manifold outlets 50, and each output 118 may terminate at, within or beyond the end cap 112. Each output 118 may be open to the interior 104 of the substrate 12, whether the substrate 12 is open, channeled or otherwise contains a plurality of conduits. Each output 118 may also be coupled to a conduit, such as a tube, that is joined directly or indirectly to the delivery ports 108 of a particular plant.

A variant of the third embodiment of the invention relates to aeroponic plant growth. A plant support structure similar to that shown in FIGS. 6 and 7. In an aeroponic process, mist rather than liquid water is delivered into the space 104. That may be done either with piping that delivers the mist at specific locations or by general delivery throughout the space 112. In addition, the top piece 100 and, optionally, the bottom piece 102 may be formed of a porous material rather than a solid material. The plants may be grown directly on and through the porous structure and so plant retainers 110 are not required. In this variant of the present invention for aeroponic operations, the plant support is a porous structure and the portals 114 through which the gaseous fluid is delivered to the underside of the plant may be accomplished through pores adjacent to the plants. As a result, the present invention may be used to establish a microclimate adjacent to a plant grown in an aeroponic process.

Figure 8:
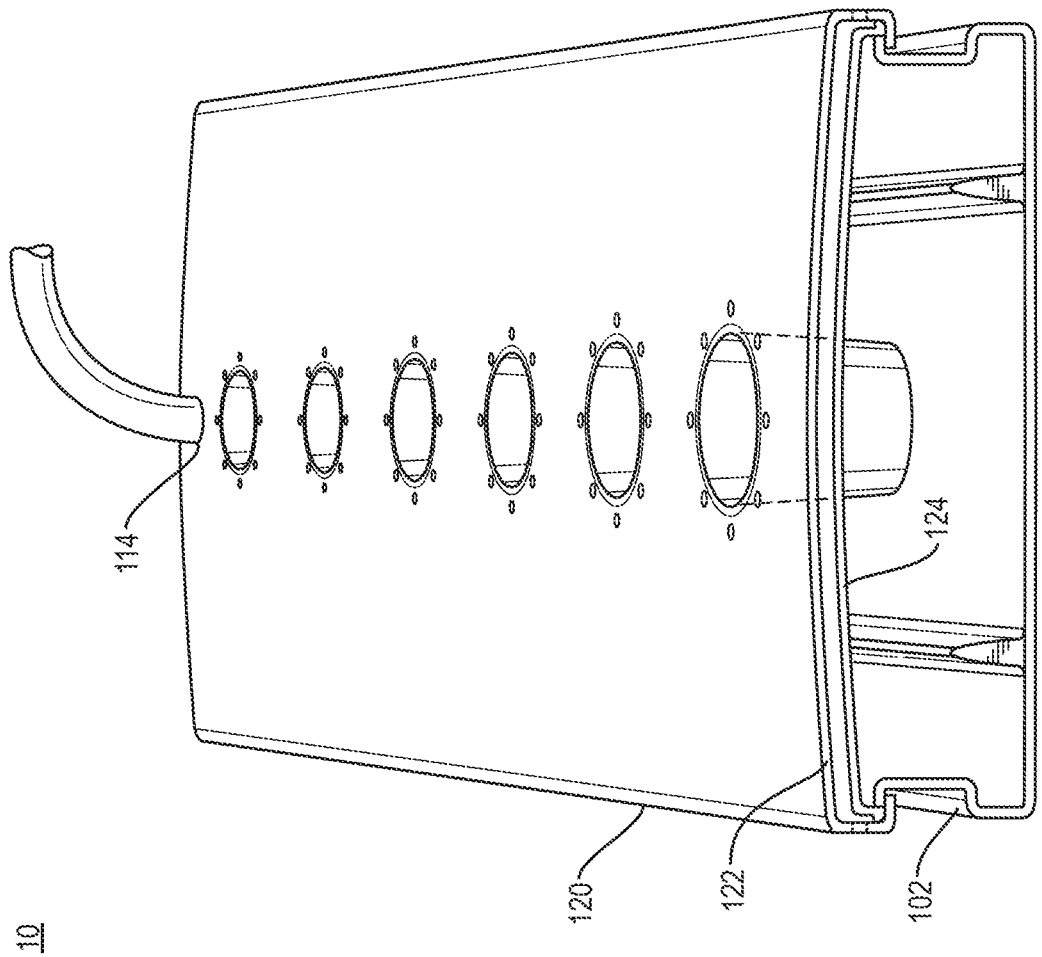
FIG. 8 is a top perspective view of a version of the third embodiment of a system of the present invention for establishing a microclimate about a plant, the system including a top piece with double wall configuration and a bottom piece.

Another variant of the third embodiment of the invention shown in FIG. 8 includes a top piece 120 and the bottom piece 102. The top piece 120 is of a double walled configuration wherein there is an upper wall 122 and a lower wall 124. A space 126 is established between the upper wall 122 and the lower wall 124. The gaseous fluid may be inserted into the space 126 so that it is forced through portals 108 extending at least partially around the retainer 110. The retainers 110 are optional when alternative mechanisms for plant retention are employed including, for example, making the top piece at least partially porous. The gaseous fluid may be directed into the space 126 via portal 114. The double walled configuration may also be used in an aeroponic system of the type described above. The substrate may also be an inflatable raft type of structure with plant retainers established therein, as well as multiple gaseous fluid delivery ports, whether distributed adjacent to individual plants or regularly or irregularly distributed throughout the substrate and not necessarily associated with individual plants.

The microclimate control subsystem 16 includes a processor 70, a controller 72 and a plurality of atmosphere sensors 74. The processor 70 may be any form of computer processing component suitable for receiving atmosphere sensing information from the atmosphere sensors 74, delivering operational instructions to the one or more gaseous fluid delivery apparatuses 40 and capable of programming using control instructions programmed into the processor 70. The processor 70 may be in the form of a desktop computer, a laptop computer, a handheld device such as a tablet or smartphone, or any other device suitable for the intended operation of the system 10. The controller 72 is coupled to the processor 70 and to the gaseous fluid delivery apparatus 40, either by wire or wirelessly. The controller 72 may be any sort of feedforward or feedback apparatus suitable for regulating operation of the gaseous fluid delivery apparatus 40.

Figure 9:
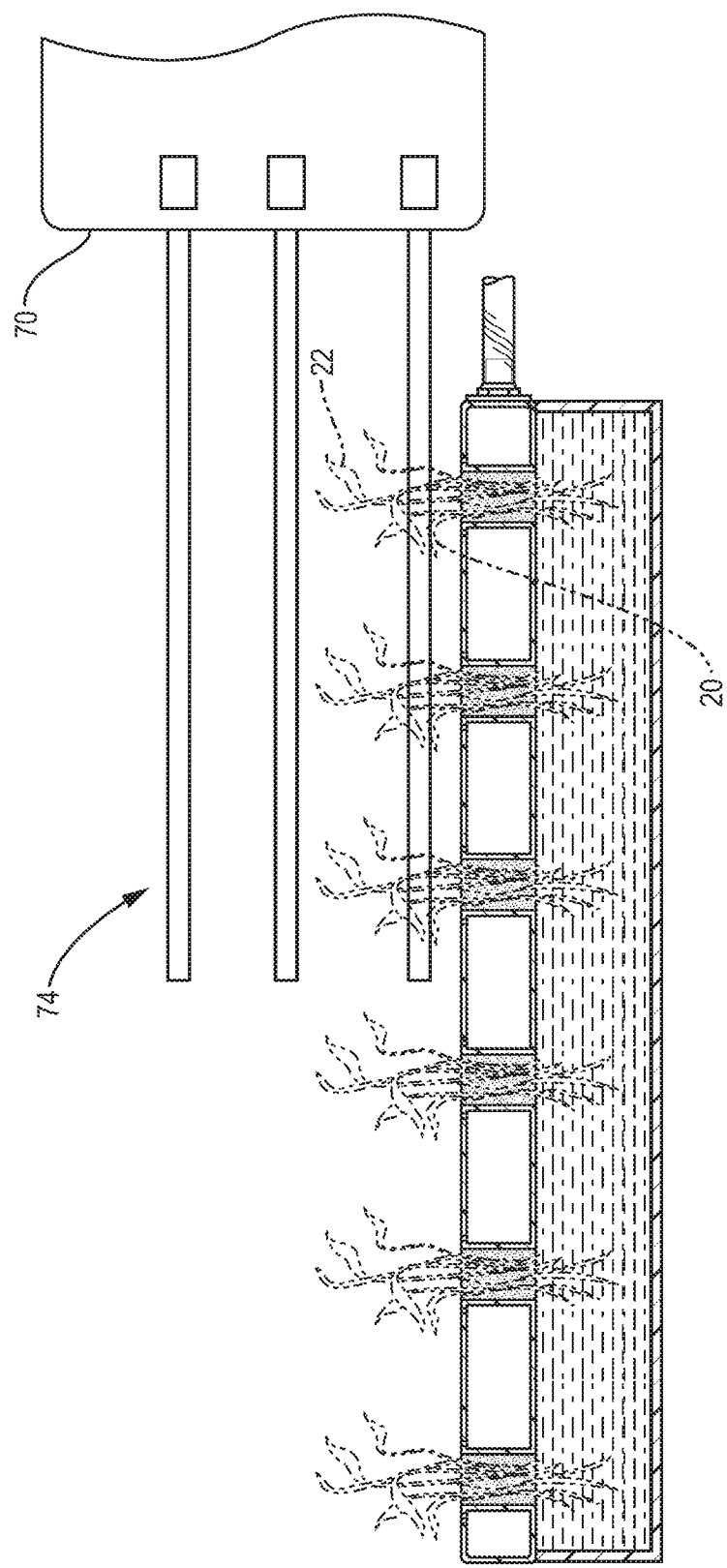
FIG. 9 is a partial cross-sectional side view of a system of the present invention showing a plurality of sensors positioned in and above plants.

The atmosphere sensors 74 are selected to gather information regarding conditions in the microenvironment of each plant 22. The sensors 74 may be selected to gather information on temperature, humidity, oxygen and carbon dioxide, for example, but not limited thereto. The sensors 74 are coupled by wire or wirelessly to the processor 70. As shown in FIG. 9, an example representation of the plurality of the sensors 74 shows that they may be positioned substantially above the tops of the plants 22, near the tops of the plants 22 and near the undersides 20 of the plants 22. The information gathered at these locations can be used to determine useful information suitable for making plant growth most efficient including, but not limited to, carbon dioxide concentrations at those locations, which information can be used to adjust input from the pump 40. The use of a plurality of atmosphere sensors, which may be more than the three in the representative example, at locations under the plant, just above the plant and well above the plant allow the operator to observe the interplay of change in conditions from under the plant up to the more general atmosphere well above the plant. It can be used to determine the directional flow of relevant atmospheric information including CO2 content, either toward or away from the plant representing plant aspiration rate through the zones or strata extending from below to above the plant. That information can then be used to adjust the microclimate adjacent to the plant as well as the larger atmosphere near to and away from the plant. Those adjustments to heat, humidity, light, etc., can be made sooner than would occur if manual observations or made or if sensing occurs at a single location or at a location or locations not adjacent to the plant, thereby optimizing growing conditions.

The microclimate control subsystem 16 may form part of a larger climate control system and so is not limited solely to operation of the gaseous fluid delivery apparatus 40 used to deliver the gaseous fluid. For example and without limitation, the larger climate control system may be used to regulate all aspects of the environment containing the plants 22 including, but not limited to, temperature, humidity, light, nutrient delivery and water delivery. The description herein of the microclimate control subsystem 16 is not intended to limit environment control solely to that of the gaseous fluid delivery to the undersides 20 of the plants 22. Further, that larger climate control system may be coupled to the sensors 74 and used to aid in regulation of the environment within the structure.

The system 10 of the present invention is used to carry out steps of the method of plant microclimate control of the present invention. The method includes inserting one or more plant seedlings or root elements into each of the retainers 30 located in the substrate 12 on the fluid 26. Dependent on the status of the seedlings or root elements, gaseous fluid is delivered from the source 38 to one or more of the ports adjacent to the plant 22 using any of the configurations described herein. The content of the gaseous fluid is selectable and dependent on the condition of the plant 22. When the plant 22 is sufficiently sized to create a canopy over a portion of the substrate 12, the content of the gaseous fluid may be adjusted, such as by increasing the carbon dioxide content, for example. The sensors 74 are employed to detect the microenvironment in the vicinity of the plant 22 to aid in regulating fluid flow from the source 38 through the pump to the ports. It is noted that the method may also include delivering the gaseous fluid directly throughout the interior of the substrate 12, through one or more channels and/or through one or more conduits as described. It is also noted that the sensors that may be used are not limited to those solely located at or near the plants. Other sensed information may be acquired in the environment and used to regulate that environment.

In an embodiment of the invention, the gaseous fluid delivery ports may be positioned regularly or irregularly around the substrate and not specifically positioned immediately adjacent to the plant retainers. That is, the delivery ports may be dispersed throughout the substrate. In that configuration, the gaseous fluid continues to be delivered near the upper surface of the substrate. Gas movement means within the building containing the invention, such as one or more fans or one or more pumps, for example, can be used to move the gaseous fluid along the substrate to produce a mixing of the gaseous fluid at the underside of all plants retained to the substrate so that there is a sharing and mixing of the gaseous fluid among groups of plants throughout the building. This is effectively a mass modification of the microclimate in the vicinity of all plants. Whereas prior greenhouse systems circulate air throughout the entire building, that circulation substantially does not exist at the local underside of the plants. The present invention resolves that limitation either with concentrated delivery ports or distributed ones.

The present invention conditions the environment at the underside of the plants, either with the immediately adjacent delivery ports described above or with an air-hockey-like arrangement of distributed delivery ports coupled with a circulation mechanism that conditions the atmosphere locally for all plants but does so with a widely distributed gaseous fluid delivery. This embodiment of the invention may be useful in most greenhouse configurations, including those with roof vents wherein mixed gaseous fluid is forced or drawn from the underside of the plants up to the ceiling of the building. The gaseous fluid first makes contact with the underside of the plant before passing upwardly through the building to be vented at the ceiling. This arrangement may be useful for growing lettuce but is not limited thereto.

The system 10 and related method shrink the area needed for tight regulation of plant growth so that it is proximal to the plant and results in the modified environment contacting the underside of plant leaves before contacting anything else in the building. Given that the underside of the plant leaves is where the bulk of gas exchange occurs, this provides an advantage for carbon dioxide enrichment and dehumidification (among other things). The leaves also help provide a boundary layer to trap this modified atmosphere near the stomata of the plant. The present invention reduces considerably the magnitude of resources spent on atmospheric control for the plants in the building.

What is claimed is:

1. A system to facilitate the growth of one or more plants in a building, the system comprising:

a substrate having an upper surface including one or more plant retainers for retaining the one or more plants and a plurality of gaseous fluid delivery ports extending through the substrate to the upper surface thereof and located in a vicinity of each of the one or more plant retainers; and a climate delivery subsystem including a gaseous fluid source and a gaseous fluid delivery apparatus with one or more gaseous fluid delivery outputs arranged to output a gaseous fluid;

wherein the substrate includes one or more conduits extending therethrough, wherein the substrate is made with sufficient structural integrity to minimize flexing or other undesirable distortion when on a fluid surface, and wherein the substrate maintains a positive buoyancy on the fluid surface; and wherein each of the one or more conduits couples each of the one or more gaseous fluid delivery ports at upper top surface of the substrate to the one or more gaseous fluid delivery outputs of the gaseous fluid delivery apparatus for delivery of the gaseous fluid from the gaseous fluid delivery apparatus to an underside of the one or more plants.

2. The system of claim 1 further comprising a microclimate control system coupled to the gaseous fluid delivery apparatus, wherein the microclimate control system includes a processor programmed to regulate operation of the gaseous fluid delivery apparatus and one or more atmosphere sensors arranged to gather information about a microclimate in the vicinity of the plant to aid in regulation of operation of the gaseous fluid delivery apparatus.

3. The system of claim 1 wherein the one or more conduits are formed of tubing within the substrate.

4. The system of claim 1 wherein at least one of the gaseous fluid delivery ports includes a nozzle.

5. The system of claim 4 wherein the nozzle is configured to form a selectable spray pattern of the gaseous fluid about the one or more plants.

6. A method for establishing a microclimate in the vicinity of a plant, the method comprising the steps of:

inserting one or more plant seedlings or root elements into a substrate;

delivering with a climate delivery subsystem a gaseous fluid to a port or a multitude of ports of the substrate, wherein the one or more ports deliver the gaseous fluid to an environment adjacent to an upper surface of the substrate about the one or more plant seedlings or root elements;

sensing environmental conditions in the microclimate associated with each of the one or more plant seedlings or root elements; and adjusting delivery of the gaseous fluid as a function of the sensed environmental conditions, wherein the substrate has the upper surface including one or more plant retainers for retaining the one or more plant seedlings or root elements and a plurality of gaseous fluid delivery ports extending through the substrate to the upper surface thereof and located in a vicinity of each of the one or more plant retainers;

wherein the substrate includes one or more conduits extending therethrough, wherein the substrate is made with sufficient structural integrity to minimize flexing or other undesirable distortion when on a fluid surface, and wherein the substrate maintains a positive buoyancy on the fluid surface; and wherein each of the one or more conduits couples each of the one or more gaseous fluid delivery ports at the upper surface of the substrate to the one or more gaseous fluid delivery outputs of the gaseous fluid delivery apparatus for delivery of the gaseous fluid from the gaseous fluid delivery apparatus to an underside of the one or more plant seedlings or root elements.

7. The method of claim 5 wherein the gaseous fluid includes carbon dioxide content.

8. The method of claim 5 wherein at least one of the gaseous fluid delivery ports includes a nozzle for delivering the gaseous fluid.

9. The method of claim 8 wherein the nozzle is configured to form a selectable spray pattern of the gaseous fluid about a plant retainer.

* * * * *